(12) United States Patent
Yu et al.

(10) Patent No.: US 10,798,060 B2
(45) Date of Patent: Oct. 6, 2020

(54) NETWORK ATTACK DEFENSE POLICY SENDING METHOD AND APPARATUS, AND NETWORK ATTACK DEFENDING METHOD AND APPARATUS

(71) Applicant: Huawei Technologies Co., Ltd., Shenzhen (CN)

(72) Inventors: Zhouyi Yu, Beijing (CN); Li Yang, Beijing (CN); Tianfu Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 16/050,313

(22) Filed: Jul. 31, 2018

(65) Prior Publication Data

US 2018/0337888 A1   Nov. 22, 2018

Related U.S. Application Data

(63) Continuation of application No. PCT/CN2016/077662, filed on Mar. 29, 2016.

(51) Int. Cl.
*H04L 29/06* (2006.01)
*H04L 12/24* (2006.01)
*H04L 12/823* (2013.01)

(52) U.S. Cl.
CPC ...... *H04L 63/0236* (2013.01); *H04L 41/0893* (2013.01); *H04L 47/32* (2013.01); *H04L 63/20* (2013.01); *H04L 63/1458* (2013.01)

(58) Field of Classification Search
CPC . H04L 63/0236; H04L 41/0893; H04L 47/32; H04L 63/20; H04L 63/1458
See application file for complete search history.

(56) References Cited

U.S. PATENT DOCUMENTS 6,363,072 B1 *   3/2002   Furuichi ............. H04L 12/4608
                                                     370/395.52
9,258,742 B1     2/2016   Pianigiani et al.
(Continued)

FOREIGN PATENT DOCUMENTS

CN   101494639 A   7/2009
CN   104580168 A   4/2015
(Continued)

OTHER PUBLICATIONS

Machine Translation and Abstract of Chinese Publication No. CN101494639, Jul. 29, 2009, 18 pages.
(Continued)

*Primary Examiner* — Abu S Sholeman
(74) *Attorney, Agent, or Firm* — Conley Rose, P.C.

(57) ABSTRACT

A network attack defense policy sending method and apparatus are presented. The method includes receiving attack information which includes a target Internet Protocol (IP) address, and the attack information is used to indicate that a network attack packet whose destination address is the target IP address exists in a first network; determining that the network attack packet enters the first network through a first edge network device, where the first edge network device is an edge device in the first network; sending a defense policy to the first edge network device, where the defense policy is used to instruct the first edge network device to process, according to the defense policy, a packet whose destination address is the target IP address. By means of this application, network resources occupied by a network attack packet can be reduced, and an effect of defending against the network attack packet can be improved.

21 Claims, 7 Drawing Sheets

(56) References Cited

U.S. PATENT DOCUMENTS

| | | | |
|---|---|---|---|
| 2002/0035683 A1 | 3/2002 | Kaashoek et al. | |
| 2002/0087725 A1* | 7/2002 | Cummings | H04L 45/742 709/243 |
| 2008/0127324 A1* | 5/2008 | Seo | H04L 63/1458 726/13 |
| 2010/0293407 A1 | 11/2010 | Locasto et al. | |
| 2011/0202685 A1* | 8/2011 | Subramaniam | G06F 15/177 709/245 |
| 2011/0222541 A1* | 9/2011 | Oishi | H04L 12/413 370/392 |
| 2014/0331308 A1 | 11/2014 | Smith et al. | |
| 2017/0126725 A1* | 5/2017 | Pal | H04L 41/14 |

FOREIGN PATENT DOCUMENTS

| | | | |
|---|---|---|---|
| CN | 105357180 A | 2/2016 | |
| CN | 105429975 A | 3/2016 | |
| EP | 3226508 A1 | 10/2017 | |

OTHER PUBLICATIONS

Machine Translation and Abstract of Chinese Publication No. CN105357180, Feb. 24, 2016, 74 pages.
"OpenFlow Switch Specification," Version 1.0.0 (Wire Protocol 0x01), ONF TS-001, Dec. 31, 2009, 44 pages.
Giotis, K., et al., "A scalable anomaly detection and mitigation architecture for legacy networks via an OpenFlow middlebox," Security and Communication Networks, Oct. 2, 2015, pp. 1958-1970.
Foreign Communication From a Counterpart Application, PCT Application No. PCT/CN2016/077662, English Translation of International Search Report dated Dec. 22, 2016, 2 pages.
Foreign Communication From a Counterpart Application, European Application No. 16895828.8, Extended European Search Report dated Jun. 22, 2018, 9 pages.
Machine Translation and Abstract of Chinese Publication No. CN105429975, Mar. 23, 2016, 24 pages.
Foreign Communication From a Counterpart Application, Chinese Application No. 201680034646.9, Chinese Office Action dated Jun. 3, 2019, 10 pages.

* cited by examiner

NETWORK ATTACK DEFENSE POLICY SENDING METHOD AND APPARATUS, AND NETWORK ATTACK DEFENDING METHOD AND APPARATUS

CROSS-REFERENCE TO RELATED APPLICATIONS

This application is a continuation of International Application No. PCT/CN2016/077662, filed on Mar. 29, 2016, the disclosure of which is hereby incorporated by reference in its entirety.

TECHNICAL FIELD

This application relates to the communications field, and in particular, to a network attack defense policy sending method and apparatus, and a network attack defending method and apparatus.

BACKGROUND

Network attacks have always been an important security problem for networks nowadays. For example, a denial of service (DoS) attack is a network attack. A DoS attack refers to attacking a vulnerability of a victim host, to cause a failure of a network protocol stack of the victim host, resource exhaustion of the victim host, suspension of the host, and a system crash, resulting in denial of service of the victim host. In DoS attacks, a distributed denial of service (DDoS) attack is a relatively common DoS attack that multiple hosts on a network launch a DoS attack to a target host at the same time.

Generally, a current network attack defending method is to deploy a special cleaning device in a network. When detecting that a packet transmitted by a network device includes a network attack packet, a network device sends the received packet to a cleaning device. The cleaning device identifies the network attack packet according to a characteristic of the network attack packet and discards the network attack packet. That is, the cleaning device cleans the packet received by the network device, and then sends a cleaned packet back to the network device.

However, the deployment of the cleaning device requires relatively high costs. In addition, before entering the cleaning device, the network attack packet has already been transmitted in various network devices in the network and occupies a large quantity of network resources. In a process in which the network device detects a network attack and sends the packet to the cleaning device, the network attack packet is still transmitted between the network device and the cleaning device, and also occupies network resources. Therefore, this solution requires high costs for defending against a network attack packet and has a poor defense effect.

SUMMARY

Embodiments of this application provide a network attack defense policy sending method and apparatus, and a network attack defending method and apparatus, to reduce network resources occupied by a network attack packet, and improve an effect of defending against the network attack packet.

According to a first aspect, an embodiment of this application provides a network attack defense policy sending method, where the method includes receiving attack information, where the attack information includes a target Internet Protocol (IP) address, and the attack information is used to indicate that a network attack packet whose destination address is the target IP address exists in a first network; determining that the network attack packet enters the first network through a first edge network device, where the first edge network device is an edge device in the first network; and sending a defense policy to the first edge network device, where the defense policy is used to instruct the first edge network device to process, according to the defense policy, a packet whose destination address is the target IP address.

In this implementation manner, because the network attack packet enters the first network through the first edge network device, sending the defense policy to the first edge network device to instruct the first edge network device to defend against the network attack reduces transmission of the network attack packet in the first network, saves transmission resources of the first network, and improves an effect of defending against the network attack packet.

In a possible implementation manner, the attack information further includes a source IP address of the network attack packet, and the determining that the network attack packet enters the first network through a first edge network device includes obtaining the source IP address from the attack information; and determining the first edge network device according to a correspondence between the source IP address and the first edge network device. In this implementation manner, the first edge network device is determined according to the correspondence, so that the first edge network device that is a source of the network attack packet can be rapidly determined, and the network attack packet can be defended against in time.

In a possible implementation manner, the determining that the network attack packet enters the first network through a first edge network device includes obtaining data traffic of packets whose destination addresses are the target IP address and that are received by each edge network device in multiple edge network devices in the first network in a preset time period, where the multiple edge network devices include the first edge network device; and determining that the data traffic received by the first edge network device in the preset time period satisfies a first preset condition. In this implementation manner, data traffic of packets having a particular destination IP address in an edge network device is obtained, and the data traffic is used as an important indicator for determining a network attack, so that a source of a network attack packet can be rapidly determined, and the network attack can be defended against in time, thereby further improving the effect of defending against the network attack packet.

In a possible implementation manner, before the determining the first edge network device according to a correspondence between the source IP address and the first edge network device, the method further includes obtaining the correspondence between the source IP address and the first edge network device from a software-defined networking (SDN) controller. In this implementation manner, a correspondence, between an IP address and an edge network device, already stored in the SDN controller is obtained from the SDN controller, so that existing information in an SDN network architecture can be fully used to rapidly determine a source of a network attack packet, thereby improving efficiency of defending against a network attack.

In a possible implementation manner, the first preset condition is that the data traffic exceeds a preset value, and the defense policy is discarding a packet whose destination address is the target IP address. In this implementation manner, when the data traffic exceeds the preset value, the defense policy of discarding a packet whose destination address is the target IP address is used, thereby preventing attack traffic of a network attack from severely threatening bandwidth of the first network.

In a possible implementation manner, the defense policy includes discarding a packet whose destination address is the target IP address. Using the defense policy of discarding a packet whose destination address is the target IP address, the first edge network device only needs to extract a destination IP address from a received packet and determine whether the destination IP address matches the target IP address. The policy can be used to defend against a network attack without occupying excessive computing resources of the first edge network device. In addition, using the defense policy also can rapidly reduce transmission resources in an entire network that are occupied by a network attack packet in the network, thereby reducing damage of the network attack packet to the network.

In a possible implementation manner, the defense policy includes discarding a packet whose destination address is the target IP address and that satisfies a second preset condition. Using the defense policy, the first edge network device can selectively discard a network attack packet, and continue to forward a normal packet, thereby improving the effect of defending against a network attack.

According to a second aspect, an embodiment of this application provides a network attack defending method, where the method includes receiving, by a first edge network device, a defense policy, where the defense policy includes a target IP address, the defense policy is used to instruct the first edge network device to process, according to the defense policy, a packet whose destination address is the target IP address, the first edge network device is an edge network device in a first network, a network attack packet whose destination address is the target IP address exists in the first network, and the network attack packet enters the first network through the first edge network device; and processing, by the first edge network device according to the defense policy, a packet whose destination address is the target IP address.

In this implementation manner, because the network attack packet enters the first network through the first edge network device, executing the defense policy at the first edge network device can reduce transmission of the network attack packet in the first network, save transmission resources of the first network, and improve an effect of defending against the network attack packet. In addition, because no special cleaning device needs to be disposed in the first network, costs of defending against a network attack are reduced.

In a possible implementation manner, data traffic of packets whose destination addresses are the target IP address and that are received by the first edge network device in a preset time period exceeds a preset value, and the defense policy is discarding a packet whose destination address is the target IP address.

In a possible implementation manner, the defense policy includes discarding a packet whose destination address is the target IP address. In a possible implementation manner, the defense policy includes discarding a packet whose destination address is the target IP address and that satisfies a second preset condition.

According to a third aspect, an embodiment of this application provides a defense policy sending apparatus, including a receiving unit, a determining unit, and a sending unit, where the receiving unit is configured to receive attack information, where the attack information includes a target IP address, and the attack information is used to indicate that a network attack packet whose destination address is the target IP address exists in a first network; the determining unit is configured to determine, according to the attack information received by the receiving unit, that the network attack packet enters the first network through a first edge network device, where the first edge network device is an edge device in the first network; and the sending unit is configured to send a defense policy to the first edge network device, where the defense policy is used to instruct the first edge network device to process, according to the defense policy, a packet whose destination address is the target IP address.

In a possible implementation manner, the attack information further includes a source IP address of the network attack packet, and the determining unit is further configured to obtain the source IP address from the attack information and configured to determine the first edge network device according to a correspondence between the source IP address and the first edge network device.

In a possible implementation manner, the determining unit is further configured to obtain data traffic of packets whose destination addresses are the target IP address and that are received by each edge network device in multiple edge network devices in the first network in a preset time period, where the multiple edge network devices include the first edge network device; and configured to determine that the data traffic received by the first edge network device in the preset time period satisfies a first preset condition.

In a possible implementation manner, the receiving unit is further configured to obtain the correspondence between the source IP address and the first edge network device from an SDN controller.

In a possible implementation manner, the first preset condition is that the data traffic exceeds a preset value, and the defense policy is discarding a packet whose destination address is the target IP address.

In a possible implementation manner, the defense policy sent to the first edge network device includes discarding a packet whose destination address is the target IP address; or discarding a packet whose destination address is the target IP address and that satisfies a second preset condition.

According to a fourth aspect, an embodiment of this application provides a first edge network device, including a receiving unit and a processing unit, where the receiving unit is configured to receive a defense policy, where the defense policy includes a target IP address, the defense policy is used to instruct the first edge network device to process, according to the defense policy, a packet whose destination address is the target IP address, the first edge network device is an edge network device in a first network, a network attack packet whose destination address is the target IP address exists in the first network, and the network attack packet enters the first network through the first edge network device; and the processing unit is configured to process, according to the defense policy received by the receiving unit, a packet whose destination address is the target IP address.

In a possible implementation manner, data traffic of packets whose destination addresses are the target IP address and that are received by the first edge network device in a preset time period exceeds a preset value, and the defense policy is discarding a packet whose destination address is the target IP address.

In a possible implementation manner, the defense policy received by the receiving unit includes discarding a packet whose destination address is the target IP address; or discarding a packet whose destination address is the target IP address and that satisfies a second preset condition.

According to a fifth aspect, an embodiment of this application provides a defense policy sending apparatus, including a processor, a network interface, and a memory, where the processor is configured to read a program stored in the memory to perform the following operations: receiving attack information using the network interface, where the attack information includes a target IP address, and the attack information is used to indicate that a network attack packet whose destination address is the target IP address exists in a first network; determining that the network attack packet enters the first network through a first edge network device, where the first edge network device is an edge device in the first network; and sending a defense policy to the first edge network device using the network interface, where the defense policy is used to instruct the first edge network device to process, according to the defense policy, a packet whose destination address is the target IP address.

In a possible implementation manner, the attack information further includes a source IP address of the network attack packet, and the determining that the network attack packet enters the first network through a first edge network device includes obtaining the source IP address from the attack information; and determining the first edge network device according to a correspondence between the source IP address and the first edge network device.

In a possible implementation manner, the determining that the network attack packet enters the first network through a first edge network device includes obtaining data traffic of packets whose destination addresses are the target IP address and that are received by each edge network device in multiple edge network devices in the first network in a preset time period, where the multiple edge network devices include the first edge network device; and determining that the data traffic of the first edge network device in the preset time period satisfies a first preset condition.

In a possible implementation manner, before the determining the first edge network device according to a correspondence between the source IP address and the first edge network device, the processor is further configured to perform obtaining the correspondence between the source IP address and the first edge network device from an SDN controller.

In a possible implementation manner, the first preset condition is that the data traffic exceeds a preset value, and the defense policy is discarding a packet whose destination address is the target IP address.

In a possible implementation manner, the defense policy sent to the first edge network device includes discarding a packet whose destination address is the target IP address; or discarding a packet whose destination address is the target IP address and that satisfies a second preset condition.

According to a sixth aspect, an embodiment of this application provides a first edge network device, including a processor, a network interface, and a memory, where the processor is configured to read a program stored in the memory to perform the following operations: receiving a defense policy using the network interface, where the defense policy includes a target IP address, the defense policy is used to instruct the first edge network device to process, according to the defense policy, a packet whose destination address is the target IP address, the first edge network device is an edge network device in a first network, a network attack packet whose destination address is the target IP address exists in the first network, and the network attack packet enters the first network through the first edge network device; and processing, according to the defense policy, a packet whose destination address is the target IP address.

In a possible implementation manner, data traffic of packets whose destination addresses are the target IP address and that are received by the first edge network device in a preset time period exceeds a preset value, and the defense policy is discarding a packet whose destination address is the target IP address.

In a possible implementation manner, the defense policy received by the apparatus includes discarding a packet whose destination address is the target IP address; or discarding a packet whose destination address is the target IP address and that satisfies a second preset condition.

BRIEF DESCRIPTION OF DRAWINGS

To describe the technical solutions in the embodiments of this application more clearly, the following briefly introduces the accompanying drawings required for describing the embodiments. The accompanying drawings in the following description show merely some embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

Figure 1:
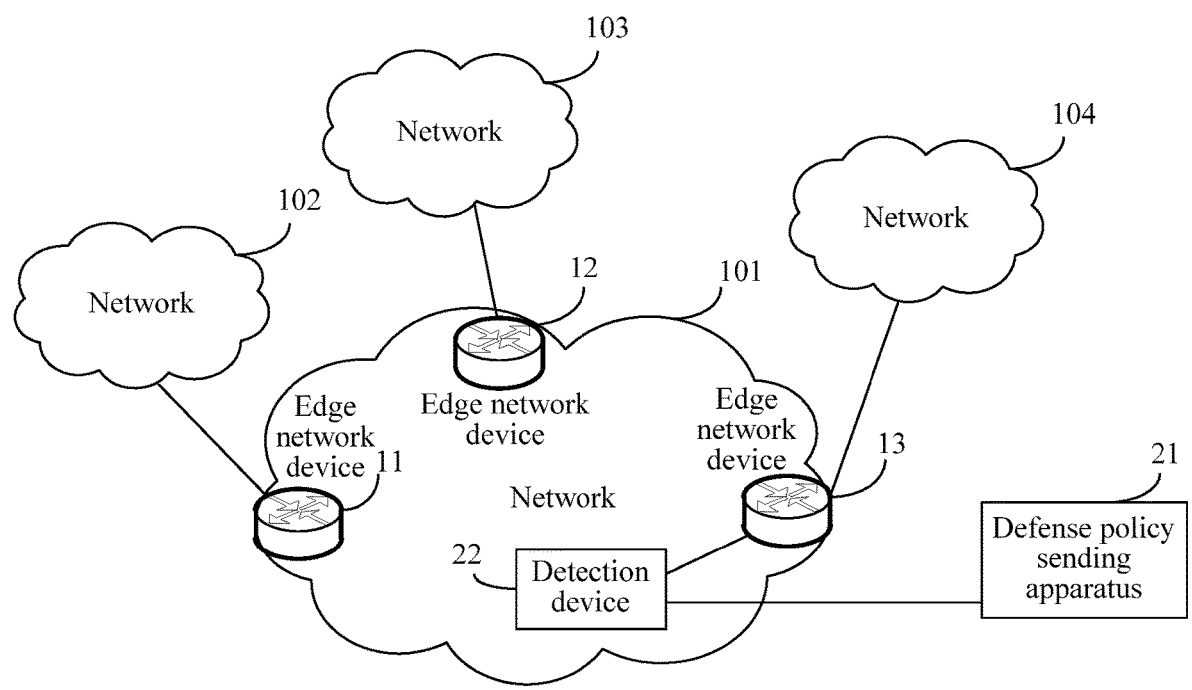
FIG. 1 is a diagram of an applicable system architecture according to an embodiment of this application.

FIG. 1 is a diagram of an applicable system architecture according to an embodiment of this application. As shown in FIG. 1, a network 101 includes multiple edge network devices, for example, an edge network device 11, an edge network device 12, and an edge network device 13. For example, the edge network device 11, the edge network device 12, and the edge network device 13 may each be a router, a switch, a firewall, a packet transport network device, a wavelength division multiplexing device, an optical transport network device, a base station, or a base station controller.

The edge network device 11 in the network 101 is connected to an edge network device in a network 102, and receives a packet from the network 102 or sends a packet to the network 102. The edge network device 12 in the network 101 is connected to an edge network device in a network 103, and receives a packet from the network 103 or sends a packet to the network 103. The edge network device 13 in the network 101 is connected to an edge network device in a network 104, and receives a packet from the network 104 or sends a packet to the network 104. For example, the network 101, the network 102, the network 103, and the network 104 may each be a provider network, or may each be a local area network. For example, assuming that the network 101 is a provider network, the edge network device 11, the edge network device 12, and the edge network device 13 may be provider edge (PE) network devices.

For example, the edge network device 12 receives a packet from the network 103 through the edge network device in the network 103, and a host corresponding to a destination IP address of the packet is a host located in the network 102. The edge network device 12 sends the packet to the edge network device 11 using network devices across one or more hops in the network 101, and the edge network device 11 sends the packet to the network device that is in the network 102 and that is connected to the edge network device 11, so that the packet enters the network 102.

A detection device 22 configured to detect a network attack packet is coupled to a network device in a network, and detects whether there is a network attack packet in packets received by the network device. For example, the detection device 22 is coupled to the edge network device 13 in the network 101, and the detection device 22 is configured to detect whether there is a network attack packet in packets received by the edge network device 13. A host targeted by the network attack packet may be a host in the network 101, or may be a host in another network, for example, a host in the network 102.

When detecting the network attack packet, the detection device 22 sends a result of the detection to a defense policy sending apparatus 21. In this embodiment of this application, the defense policy sending apparatus 21 may be an independent physical device, for example, a server. The defense policy sending apparatus 21 may alternatively be a functional module deployed on a physical device. The defense policy sending apparatus 21 may be a device or a functional module located inside or outside the network 101.

The defense policy sending apparatus 21 may communicate with each edge network device in the network 101, and send a defense policy to an edge network device that is in the network 101 and that needs to defend against a network attack.

In a possible example, each edge network device in the network 101 may communicate with the defense policy sending apparatus 21 using the Simple Network Management Protocol (SNMP).

Figure 2:
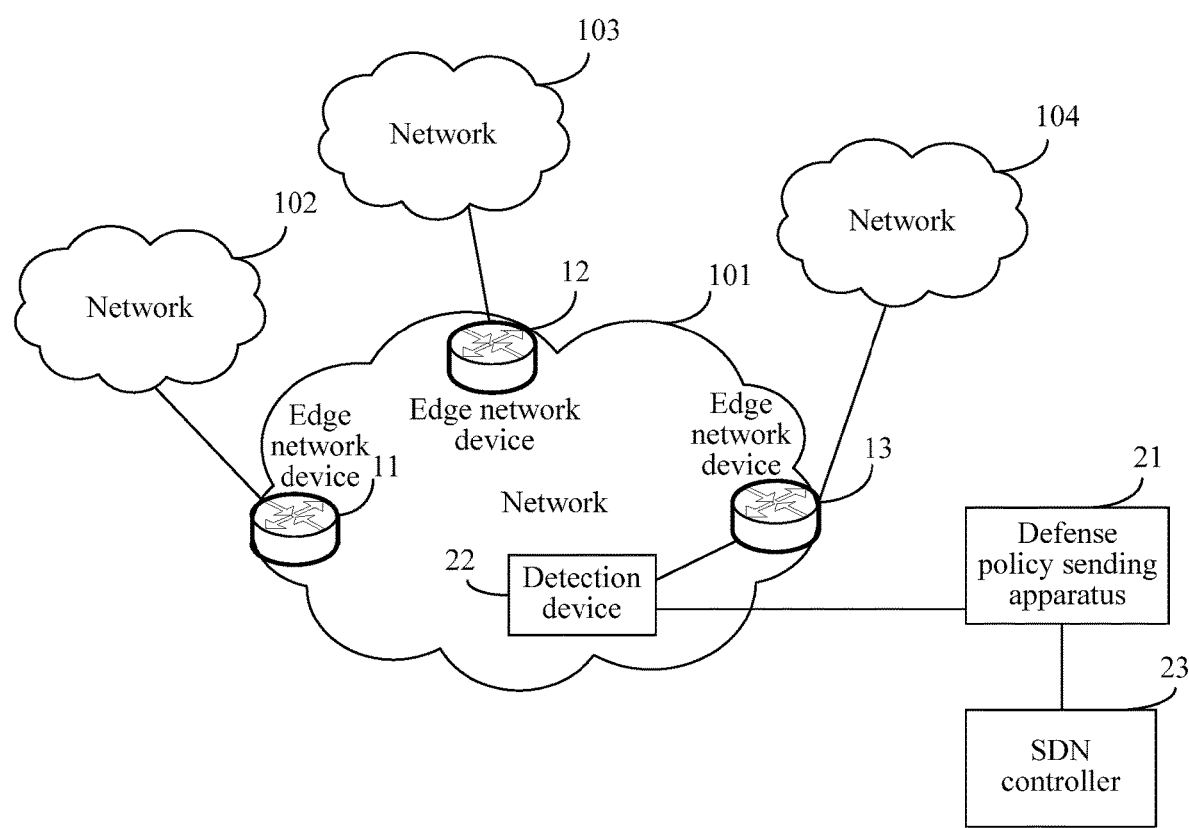
FIG. 2 is a diagram of another applicable system architecture according to an embodiment of this application.

In another possible example, as shown in FIG. 2, each network device in the network 101 communicates with a SDN controller 23, and the SDN controller 23 communicates with the defense policy sending apparatus 21. The SDN controller 23 collects information that a network device needs to send to the defense policy sending apparatus 21, and sends the information to the defense policy sending apparatus 21; or the SDN controller 23 sends, to each network device using a connection established in advance with each network device, a defense policy that the defense policy sending apparatus 21 needs to send to each network device. For example, a network device in the network 101 communicates with the SDN controller 23 using the internal Border Gateway Protocol (iBGP). The SDN controller 23 may be an independent physical device, for example, a server. The SDN controller 23 may alternatively be a functional module deployed on a same physical device together with the defense policy sending apparatus 21. Certainly, each edge network device in the system architecture shown in FIG. 2 may also communicate with the defense policy sending apparatus 21.

For example, in the system architecture shown in FIG. 1 or FIG. 2, the network attack packet may be a DoS attack packet and may be, for example, a DDoS attack packet.

For example, the network attack packet may be a flood attack packet, a malformed packet attack packet, or a scanning/probing attack packet. The flood attack means that an attacker sends a large quantity of false requests to a target system in a short time, to make the target system be busy with processing useless information and fail to provide a normal service for an authorized user. For example, the flood attack packet may be one or more of a synchronous Flood (SYN Flood) packet, a HyperText Transfer Protocol Get Flood packet, a User Datagram Protocol Flood (UDP Flood) packet, a Domain Name System Query Flood (DNS Query Flood) packet, an Acknowledgement Flood (ACK Flood) packet, an Internet Control Message Protocol Flood (ICMP Flood) packet, a Character Generator Protocol (Chargen) reflection attack (Chargen reflection attack) packet, or a Network Time Protocol Reflection Attack (NTP Reflection Attack) packet.

The malformed packet attack generally means that an attacker sends a large quantity of defective packets, to cause a host or a server to consume a large quantity of resources when processing the packets or cause a system crash. For example, the malformed packet attack packet may be one or more of a Session Initiation Protocol Freak (SIP Freak) packet, a BGP freak packet, an Intermediate System to Intermediate System Freak (ISIS Freak) packet, a Real-Time Streaming Protocol Freak (RTSP Freak) packet, or a Transmission Control Protocol Flag Error (TCP Flag Error) packet.

The scanning/probing attack may be a potential attack behavior and does not have a direct destructive behavior. The scanning/probing attack packet is usually a network probing behavior before an attacker launches a real attack.

Figure 3:
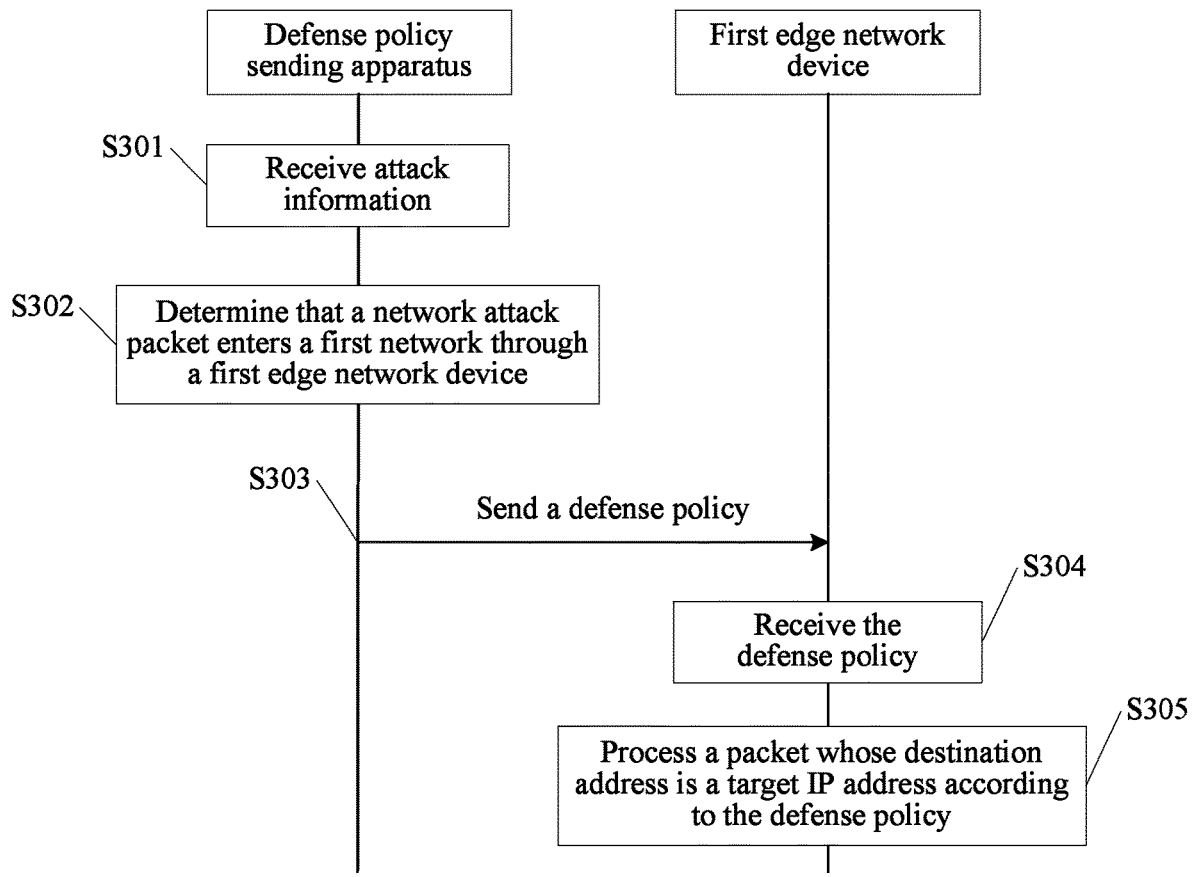
FIG. 3 is a schematic diagram of a method for sending a network attack defense policy and defending against a network attack according to an embodiment of this application.

Referring to FIG. 3, FIG. 3 is a schematic diagram of a method for sending a network attack defense policy and defending against a network attack according to an embodiment of this application. For example, the method may be applied to an application scenario shown in FIG. 1 or FIG. 2. A first network in the method shown in FIG. 3 may be the network 101 shown in FIG. 1 or FIG. 2. A first edge network device in the method shown in FIG. 3 may be the edge network device 12 shown in FIG. 1 or FIG. 2. S301, S302, and S303 in the method shown in FIG. 3 may be performed by the defense policy sending apparatus 21 shown in FIG. 1 or FIG. 2. As shown in FIG. 3, the method includes the following steps.

S301: Receive attack information, where the attack information includes a target IP address, and the attack information is used to indicate that a network attack packet whose destination address is the target IP address exists in a first network.

The attack information received in S301 may be from a network device in the network 101, for example, any network device in the network 101 in FIG. 1 or FIG. 2. Alternatively, the attack information may be from a detection device coupled to any network device in the network 101 in FIG. 1 or FIG. 2, for example, the detection device 22 coupled to the edge network device 13 shown in FIG. 1 or FIG. 2. Certainly, it may be understood in the art that the detection device 22 may alternatively be coupled to a non-edge network device in the network 101. In the network 101, there may be one or more detection devices coupled to a network device.

For example, the detection device 22 is coupled to the edge network device 13. The edge network device 13 duplicates a received packet and sends the packet to the detection device 22. The detection device 22 analyzes whether the packet has a characteristic of a network attack packet. If the packet has a characteristic of a network attack packet, the detection device 22 obtains a destination IP address of the network attack packet, and writes the destination IP address of the network attack packet into the attack information. For examples of specific characteristics of a network attack packet, refer to examples in S303.

For example, the attack information may further include an attack type and a data traffic volume of a network attack to the target IP address.

S302: Determine that the network attack packet enters the first network through a first edge network device, where the first edge network device is an edge device in the first network.

In one embodiment, that the network attack packet enters the first network through a first edge network device means that the first edge network device receives the network attack packet from an edge network device of another network that communicates with the first edge network device. For example, as shown in FIG. 1, the first edge network device is the edge network device 12, the first network is the network 101, and the edge network device 12 communicates with the network 103 and receives a packet sent by an edge network device in the network 103. The network attack packet is sent from a second edge network device in the network 103 to the edge network device 12. In this way, the network attack packet enters the network 101. The first edge network device, that is, a source from which the network attack packet enters the first network, can be found by performing S302. For examples of specific methods for determining the first edge network device, refer to descriptions of FIG. 4 and FIG. 5.

S303: Send a defense policy to the first edge network device, where the defense policy is used to instruct the first edge network device to process, according to the defense policy, a packet whose destination address is the target IP address.

For example, the defense policy sent in S303 may include discarding a packet whose destination address is the target IP address; or discarding a packet whose destination address is the target IP address and that satisfies a second preset condition.

The discarding a packet whose destination address is the target IP address may be discarding all packets whose destination addresses are the target IP address. Alternatively, the discarding a packet whose destination address is the target IP address may be discarding all packets whose destination addresses are the target IP address and that are received in a particular time period. In an example, when data traffic of packets whose destination addresses are the target IP address and that are received by the first edge network device in a preset time period exceeds a first preset value, the defense policy sending apparatus 21 sends the defense policy of discarding a packet whose destination address is the target IP address, to the first edge network device. The data traffic may be sent by the first edge network device to the defense policy sending apparatus 21 in a manner described in FIG. 5. In another example, when data traffic of packets whose destination addresses are the target IP address and that are received by a network device coupled to the detection device 22 in a preset time period exceeds a first preset value, the defense policy sending apparatus 21 sends the defense policy of discarding a packet whose destination address is the target IP address, to the first edge network device. If the data traffic is the data traffic received by the network device coupled to the detection device 22, the data traffic may be carried in the attack information described in step S301. Using the defense policy of discarding a packet whose destination address is the target IP address, the first edge network device only needs to extract a destination IP address from a received packet and determine whether the destination IP address of the received packet is the same as the target IP address. If the destination IP address of the received packet is the same as the target IP address, the first edge network device discards the received packet; or if the destination IP address of the received packet is not the same as the target IP address, the first edge network device normally forwards the received packet. The defense policy can be used to defend against a network attack without occupying excessive computing resources of the first edge network device. In addition, using the defense policy also can rapidly reduce transmission resources in an entire network that are occupied by a network attack packet in the network, thereby reducing damage of the network attack packet to the network.

In a possible example, in the defense policy of discarding a packet whose destination address is the target IP address and that satisfies a second preset condition, the second preset condition is a type of a transfer protocol of the packet. For example, the first edge network device pre-stores a transfer type of a packet that a host corresponding to the target IP address needs to receive. For example, the host only needs to receive a service that is transmitted using the Transmission Control Protocol (TCP). In this case, when a protocol number carried by a packet is not the TCP, for example, when a protocol number carried by a packet is the User Datagram Protocol (UDP), the packet satisfies the second preset condition. That is, according to the defense policy, the edge network device 12 discards a packet whose protocol number is not the TCP protocol in the packets whose destination addresses are the target IP address.

In another possible example, in the defense policy of discarding a packet whose destination address is the target IP address and that satisfies a second preset condition, the second preset condition is a characteristic of a network attack packet of a particular type. For example, the characteristic of the network attack packet may be that a length of a received packet exceeds a second preset value. For example, an NTP packet usually has more than 100 bytes only, but an NTP attack packet usually has thousands of bytes. Therefore, the second preset value may be set to a value that exceeds a length of a normal NTP packet, for example, set to 500 bytes.

This embodiment of this application provides correspondences between some typical network attack packet types and network attack packet lengths, as shown in Table 1.

TABLE 1

| Network Attack Packet | Characteristic |
| --- | --- |
| UDP Flood Packet | Protocol = UDP |
|  | Packet length >= 1000 bytes |
| NTP Reflection Attack Packet | Source port (Source Port) = 123 |
|  | Protocol = UDP |
|  | Packet length > 128 bytes |
| DNS Reflection Attack Packet | Source Port = 53 |
|  | Protocol = UDP |
|  | Packet length > 512 bytes |
| Large SYN Packets Flood Packet | Protocol = TCP |
|  | SYN field = 1 |
|  | Packet length > 128 bytes |

For example, for a malformed packet, the second preset condition may be a typical characteristic of a malformed packet. For example, if a received packet is a TCP packet, a TCP header of the TCP packet includes six identifiers: (1) an urgent (URG) identifier, indicating that an urgent pointer field is valid; (2) an ACK identifier, indicating that an acknowledged sequence number field is valid; (3) a product summary header (PSH) identifier, indicating that a receiving party should send the packet segment to an application layer as soon as possible; (4) an RST identifier, indicating connection reestablishment; (5) an SYN identifier, indicating a synchronization number; and (6) a FIN identifier, indicating that no data needs to be subsequently sent by an originating end. In a normal TCP packet, values of the identifiers (1) to (6) only appear according to a particular rule, and a TCP packet that is not identified according to the particular rule affects a response speed of a host that receives the TCP packet. Therefore, when the identifiers (1) to (6) are in the following combinations, the packet may be directly considered to be a malformed packet, that is, the second preset condition may be set to: The values of the six identifiers in the TCP header are any one of the following:

(1) all the identifiers (1) to (6) have a value of 1;
(2) all the identifiers (1) to (6) have a value of 0;
(3) the SYN identifier has a value of 1, and the RST identifier has a value of 1;
(4) the FIN identifier has a value of 1, and the RST identifier has a value of 1;
(5) only one of the FIN identifier, the URG identifier, or the PSH identifier has a value of 1, and all the other five identifiers have a value of 0; or
(6) a packet whose SYN identifier has a value of 1 includes a payload.

For example, the defense policy sending apparatus pre-stores defense policies for network attack packets of different types, and selects one of the pre-stored defense policies after receiving attack information. Further, the defense policy sending apparatus may adjust the defense policy according to a parameter in the attack information.

S304: The first edge network device receives the defense policy.

The defense policy is the defense policy generated in step S303. The defense policy includes the target IP address. The defense policy is used to instruct the first edge network device to process, according to the defense policy, a packet whose destination address is the target IP address. The first edge network device is an edge network device in the first network, a network attack packet whose destination address is the target IP address exists in the first network, and the network attack packet enters the first network through the first edge network device.

S305: The first edge network device processes, according to the defense policy, a packet whose destination address is the target IP address.

In other embodiments, the first edge network device executes the defense policy for a packet whose destination address is the target IP address. For a specific example of the defense policy, refer to the description of the example of the defense policy in S303, and no example is described herein again.

Optionally, the method may further include outputting, by the defense policy sending apparatus, a defense report. For example, the defense report may include a quantity of packets whose destination addresses are the target IP address and that are discarded by the first edge network device according to the defense policy. The defense report may further include an attack type or the like of a network attack to the target IP address. A user can learn a network security status from the defense report.

In this embodiment, by means of the foregoing steps, a network attack can be defended against at its source in the first network, so that the first network is effectively protected, and transmission resources in the first network are saved. In addition, in this embodiment, because a network attack packet is processed using an edge network device and no special cleaning device needs to be used, costs of implementation are effectively reduced while ensuring a defense effect.

Figure 4:
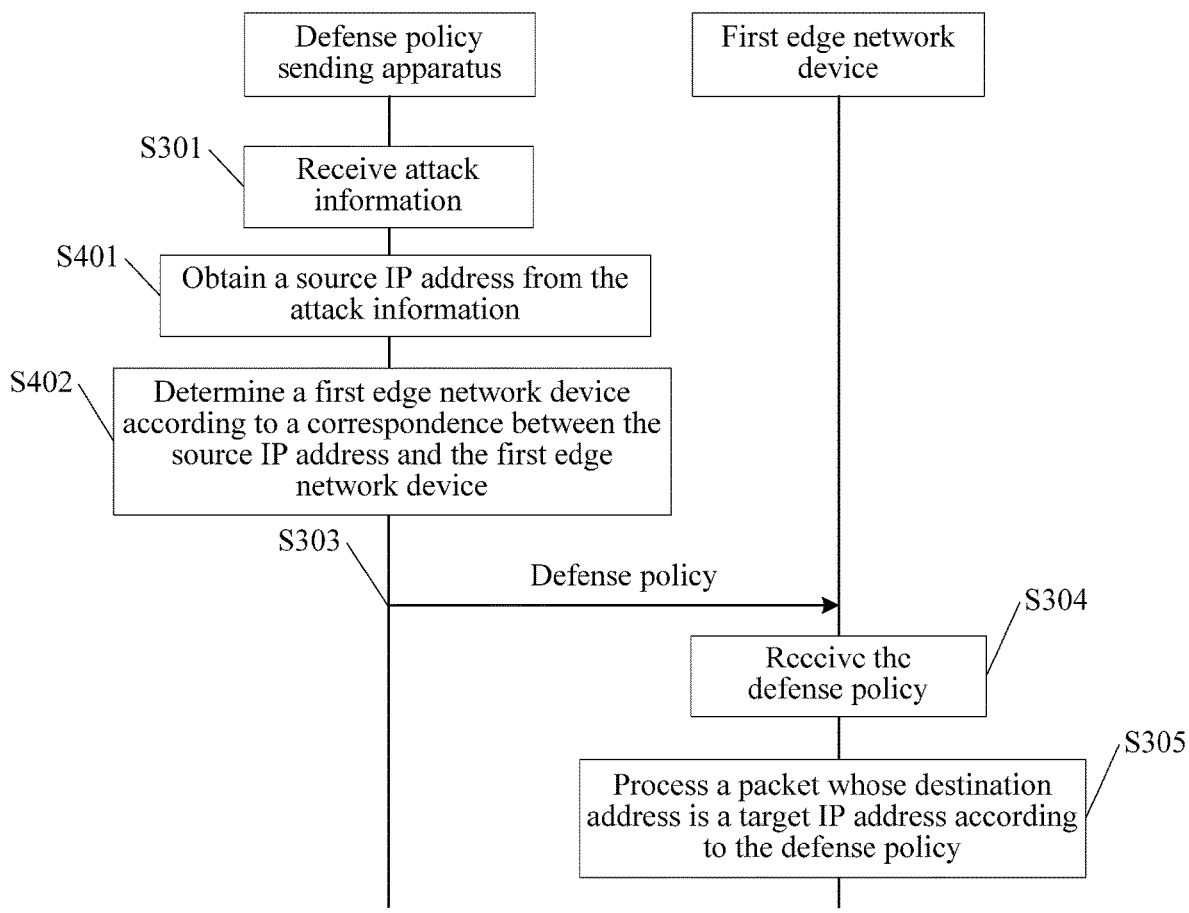
FIG. 4 is a schematic diagram of another method for sending a network attack defense policy and defending against a network attack according to an embodiment of this application.

FIG. 4 is a schematic diagram of another method for sending a network attack defense policy and defending against a network attack according to an embodiment of this application. The solution recorded in FIG. 4 is obtained by making some modifications to the solution recorded in FIG. 3. Only parts different from those in FIG. 3 are described below. For the same part, refer to the description of FIG. 3.

In the embodiment shown in FIG. 4, the attack information further includes a source IP address of the network attack packet, and S302 includes S401 and S402.

S401: Obtain the source IP address from the attack information.

In other embodiments, the source IP address is a source IP address from which the network attack packet is sent, that is, an IP address of a host that sends the network attack packet.

S402: Determine the first edge network device according to a correspondence between the source IP address and the first edge network device.

For example, the correspondence may be obtained from a routing table of the first edge network device. For example, the routing table of the first edge network device is searched for a matching entry according to the source IP address of the network attack packet. If a first routing entry is found from the routing table of the first edge device, a destination IP address in the first routing entry is a first IP address, a next hop stored in the first routing entry is an IP address of a network device that is of another network other than the first network and that is connected to the first edge network device, and the first IP address matches the source IP address of the network attack packet, it is determined that there is a correspondence between the source IP address and the first edge network device. For example, that the first IP address matches the source IP address of the network attack packet may refer to a longest prefix match.

It is assumed that the edge network device 12 in FIG. 1 is the first edge network device, and the source IP address of the network attack packet is 192.168.20.19. The routing table of the first edge network device is searched for a matching entry according to the source IP address of the network attack packet. If a first routing entry is found from the routing table of the edge network device 12, a destination IP address in the first routing entry is a first IP address 192.168.0.0/16, and a next hop in the first routing entry is an IP address of an edge network device in the network 103, it is considered that there is a correspondence between the source IP address and the edge network device 12.

For example, the routing table may be understood as a routing table generated using the External Border Gateway Protocol (eBGP).

In a possible example, the defense policy sending apparatus obtains the correspondence between the source IP address and the first edge network device from an SDN controller.

For example, in the system architecture shown in FIG. 2, the SDN controller 23 obtains routing tables of multiple edge network devices including the first edge network device. In an example, before S301 or after S301, the SDN controller 23 obtains routing tables of multiple edge network devices in the first network, generates multiple correspondences according to multiple routing entries in the multiple routing tables, where the correspondences include correspondences between IP addresses and edge network devices, and sends the correspondences to the defense policy sending apparatus 21. After S301, the defense policy sending apparatus 21 finds the correspondence between the source IP address and the first edge network device from the multiple correspondences between the IP addresses and the edge network devices according to the source IP address of the network attack packet in the attack information. In another example, after S301, the defense policy sending apparatus may send the source IP address to the SDN controller 23, and the SDN controller 23 sends an identifier of the first edge network device to the defense policy sending apparatus 21 after finding the correspondence between the source IP address and the first edge network device.

In another possible example, the defense policy sending apparatus obtains the correspondence between the source IP address and the first edge network device from the first edge network device.

For example, in the system architecture shown in FIG. 1 or FIG. 2, each edge network device in the network 101 reports its routing table to the defense policy sending apparatus 21 using the SNMP. The defense policy sending apparatus 21 obtains the correspondence from the routing table sent by each edge network device.

In this embodiment, the first edge network device is determined according to the correspondence, so that the first edge network device that is a source of the network attack packet in the first network can be rapidly determined, and the network attack packet can be defended against in time.

Figure 5:
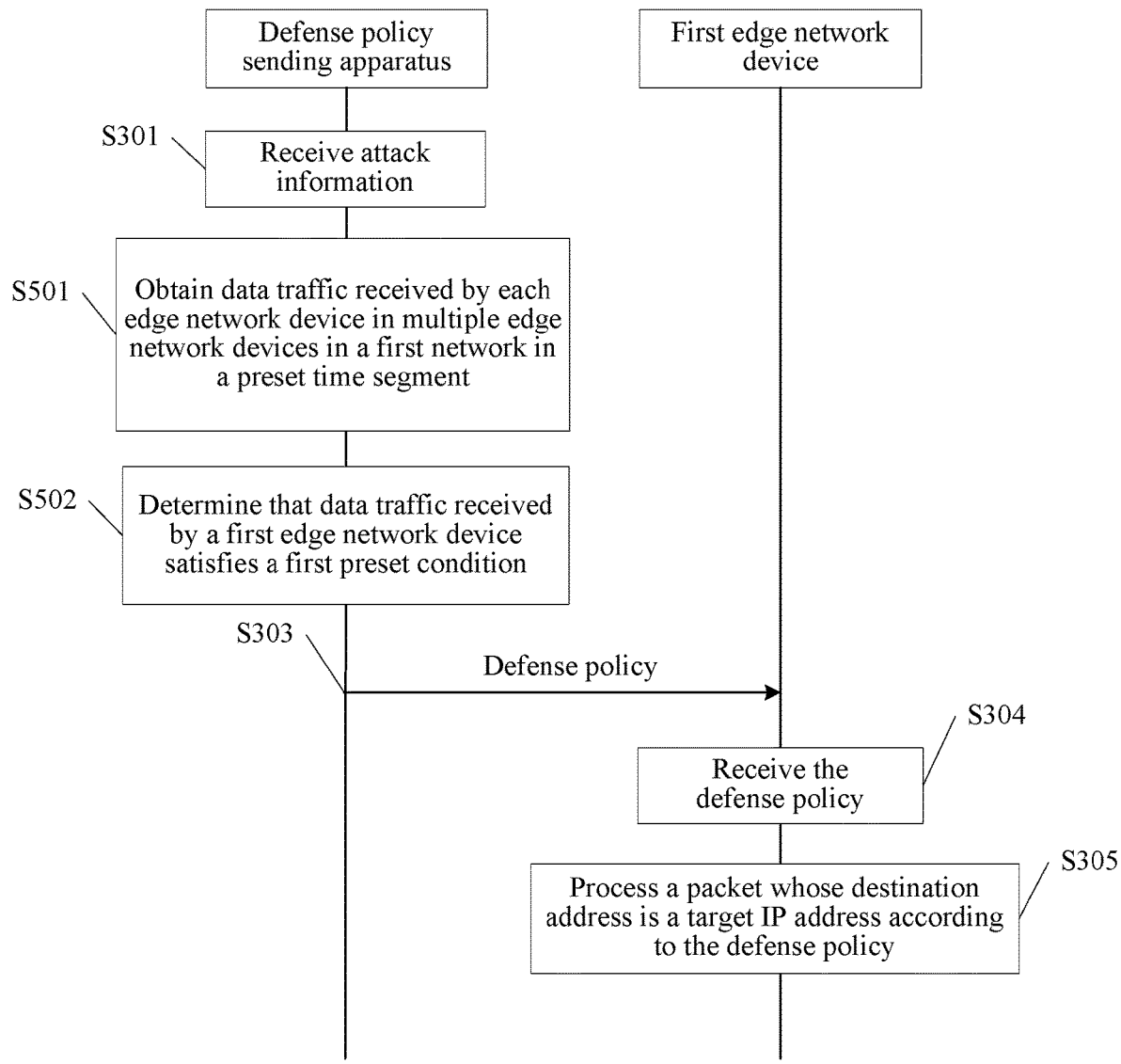
FIG. 5 is a schematic diagram of another method for sending a network attack defense policy and defending against a network attack according to an embodiment of this application.

FIG. 5 is a schematic diagram of another method for sending a network attack defense policy and defending against a network attack according to an embodiment of this application. The solution recorded in FIG. 5 is obtained by making some modifications to the solution recorded in FIG. 3. Only parts different from those in FIG. 3 are described below. For the same part, refer to the description of FIG. 3.

In the embodiment shown in FIG. 5, step S302 includes steps S501 and S502.

S501: Obtain data traffic of packets whose destination addresses are the target IP address and that are received by each edge network device in multiple edge network devices in the first network in a preset time period, where the multiple edge network devices include the first edge network device.

In a possible example, for example, in the application scenario shown in FIG. 1, the defense policy sending apparatus 21 directly sends a data traffic statistics indication to each edge network device. When receiving the data traffic statistics indication, each edge network device reports the data traffic to the defense policy sending apparatus. For example, the edge network device may report the data traffic to the defense policy sending apparatus using the SNMP.

In another possible example, for example, in the application scenario shown in FIG. 2, the defense policy sending apparatus 21 may send the data traffic statistics indication using the SDN controller 23, and then the SDN controller 23 sends the data traffic statistics indication to each edge network device. For example, the defense policy sending apparatus 21 communicates with the SDN controller 23 using an interface of a representational state transfer (REST) architecture. The SDN controller 23 communicates with each network device using the Network Configuration (NETCONF) Protocol. The defense policy sending apparatus 21 sends the data traffic statistics indication to the SDN controller 23. After receiving the data traffic statistics indication, the SDN controller 23 converts the data traffic statistics indication to a data traffic statistics indication of the Network Configuration Protocol, and sends the converted data traffic statistics indication to each edge network device. In this example, the edge network device may directly report the data traffic to the defense policy sending apparatus 21 using the SNMP, or report the data traffic to the defense policy sending apparatus 21 using the SDN controller 23.

In a possible example, the defense policy sending apparatus may send the data traffic statistics indication to all edge network devices in the first network, and all the edge network devices in the first network send their data traffic obtained through statistics to the defense policy sending apparatus.

In another possible example, the defense policy sending apparatus determines, in the first network, an edge network device that has a routing entry including the target IP address in the attack information, and sends the data traffic statistics indication to the edge network device having the routing entry. A person skilled in the art may understand that the defense policy sending apparatus may directly obtain a routing table of the edge network device and search for the routing entry, or may determine the edge network device having the routing entry using the SDN controller 23.

S502: Determine that the data traffic received by the first edge network device in the preset time period satisfies a first preset condition.

In a possible example, after the data traffic of each edge network device in the multiple edge network devices in the first network is obtained, the multiple pieces of data traffic are sorted, and the first preset condition may be one or more edge network devices corresponding to the largest data traffic of the multiple pieces of data traffic.

In another possible example, the first preset condition may be that the data traffic exceeds a preset value.

In this embodiment, data traffic of packets having a particular destination IP address in an edge network device is obtained, and the data traffic is used as an important indicator for determining a network attack, so that a source of a network attack packet can be rapidly determined, and the network attack can be defended against in time, thereby further improving an effect of defending against the network attack packet.

Figure 6:
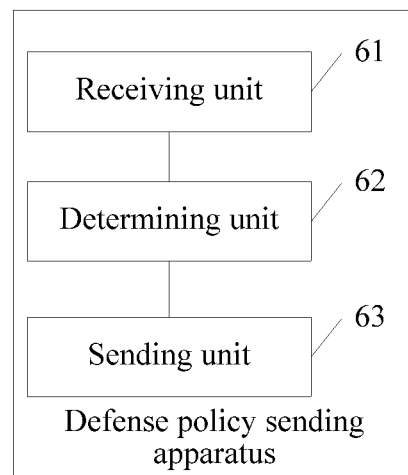
FIG. 6 is a schematic structural diagram of a defense policy sending apparatus according to an embodiment of this application.

Referring to FIG. 6, FIG. 6 is a schematic structural diagram of a defense policy sending apparatus according to an embodiment of this application. As shown in FIG. 6, the apparatus includes a receiving unit 61, a determining unit 62, and a sending unit 63. For example, the defense policy sending apparatus may be a server, or may be a software or hardware module on a server. The receiving unit 61 and the sending unit 63 may be a network interface, and may be, for example, a network interface 82 shown in FIG. 8. The determining unit 62 may be a processor, and may be, for example, a processor 81 shown in FIG. 8.

The receiving unit 61 is configured to receive attack information, where the attack information includes a target IP address, and the attack information is used to indicate that a network attack packet whose destination address is the target IP address exists in a first network.

The determining unit 62 is configured to determine, according to the attack information received by the receiving unit 61, that the network attack packet enters the first network through a first edge network device, where the first edge network device is an edge device in the first network.

The sending unit 63 is configured to send a defense policy to the first edge network device, where the defense policy is used to instruct the first edge network device to process, according to the defense policy, a packet whose destination address is the target IP address.

Optionally, the attack information further includes a source IP address of the network attack packet, and the determining unit 62 may further be configured to obtain the source IP address from the attack information and configured to determine the first edge network device according to a correspondence between the source IP address and the first edge network device.

In this implementation manner, the receiving unit 61 is further configured to obtain the correspondence between the source IP address and the first edge network device from an SDN controller; or the receiving unit 61 is further configured to obtain the correspondence between the source IP address and the first edge network device from the first edge network device.

Optionally, the determining unit 62 is further configured to obtain data traffic of packets whose destination addresses are the target IP address and that are received by each edge network device in multiple edge network devices in the first network in a preset time period, where the multiple edge network devices include the first edge network device; and configured to determine that the data traffic received by the first edge network device in the preset time period satisfies a first preset condition.

Optionally, the first preset condition is that the data traffic exceeds a preset value, and the defense policy is discarding a packet whose destination address is the target IP address.

Optionally, the defense policy sent to the first edge network device includes discarding a packet whose destination address is the target IP address; or discarding a packet whose destination address is the target IP address and that satisfies a second preset condition.

The steps in FIG. 3 to FIG. 5 may be performed by the defense policy sending apparatus in this embodiment. The defense policy sending apparatus in this embodiment may be the defense policy sending apparatus 21 in the system architectures shown in FIG. 1 and FIG. 2.

In this embodiment, because the network attack packet enters the first network through the first edge network device, sending the defense policy to the first edge network device to instruct the first edge network device to defend against the network attack reduces transmission of the network attack packet in the first network, saves transmission resources of the first network, and improves an effect of defending against the network attack packet.

Figure 7:
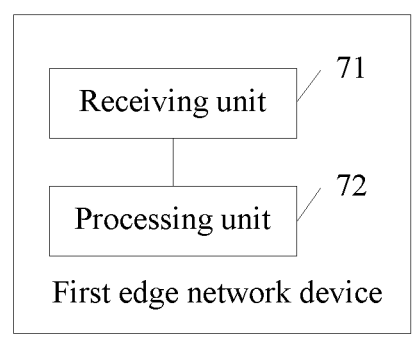
FIG. 7 is a schematic structural diagram of a first edge network device according to an embodiment of this application.

Referring to FIG. 7, FIG. 7 is a schematic structural diagram of a first edge network device according to an embodiment of this application. As shown in FIG. 7, the edge network device includes a receiving unit 71 and a processing unit 72. For example, the first edge network device may be a router. The receiving unit 71 may be a network interface, for example, a network interface 92 shown in FIG. 9. The processing unit 72 may be a processor, for example, a processor 91 shown in FIG. 9.

The receiving unit 71 is configured to receive a defense policy, where the defense policy includes a target IP address, the defense policy is used to instruct the first edge network device to process, according to the defense policy, a packet whose destination address is the target IP address, the first edge network device is an edge network device in a first network, a network attack packet whose destination address is the target IP address exists in the first network, and the network attack packet enters the first network through the first edge network device.

The processing unit 72 is configured to process, according to the defense policy received by the receiving unit 71, a packet whose destination address is the target IP address.

Optionally, data traffic of packets whose destination addresses are the target IP address and that are received by the first edge network device in a preset time period exceeds a preset value, and the defense policy is discarding a packet whose destination address is the target IP address.

Optionally, the defense policy received by the receiving unit 71 includes discarding a packet whose destination address is the target IP address; or discarding a packet whose destination address is the target IP address and that satisfies a second preset condition.

The first edge network device in this embodiment may be the first edge network device in the embodiments shown in FIG. 3 to FIG. 5. The first edge network device in this embodiment may be the edge network device in the system architectures shown in FIG. 1 and FIG. 2.

In this embodiment, because the network attack packet enters the first network through the first edge network device, executing the defense policy at the first edge network device reduces transmission of the network attack packet in the first network, saves transmission resources of the first network, and improves an effect of defending against the network attack packet.

Figure 8:
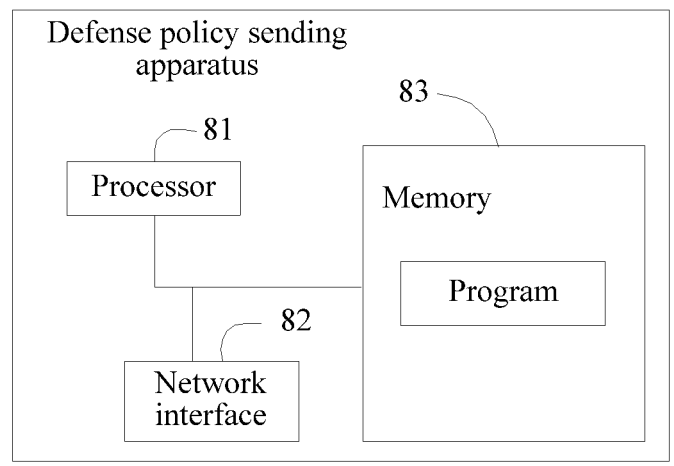
FIG. 8 is a schematic structural diagram of another defense policy sending apparatus according to an embodiment of this application.

Referring to FIG. 8, FIG. 8 is a schematic structural diagram of another defense policy sending apparatus according to an embodiment of this application. As shown in FIG. 8, the defense policy sending apparatus includes a processor 81, a network interface 82, and a memory 83.

The processor 81 includes, but is not limited to, one or more of a central processing unit (CPU), a network processor (NP), an application-specific integrated circuit (ASIC), or a programmable logic device (PLD). The PLD may be a complex programmable logic device (CPLD), a field-programmable gate array (FPGA), a generic array logic (GAL), or any combination thereof.

The network interface 82 may be a wired interface, such as a fiber distributed data interface (FDDI), or an Ethernet interface. Alternatively, the network interface 82 may be a wireless interface, such as a wireless local area network interface.

The memory 83 includes, but is not limited to, a random access memory (RAM), a read-only memory (ROM), and an erasable programmable read-only memory EPROM).

The processor 81 is configured to read a program stored in the memory 83 to perform the following operations: receiving attack information using the network interface 82, where the attack information includes a target IP address, and the attack information is used to indicate that a network attack packet whose destination address is the target IP address exists in a first network; determining that the network attack packet enters the first network through a first edge network device, where the first edge network device is an edge device in the first network; and sending a defense policy to the first edge network device using the network interface 82, where the defense policy is used to instruct the first edge network device to process, according to the defense policy, a packet whose destination address is the target IP address.

Optionally, the attack information further includes a source IP address of the network attack packet, and the determining that the network attack packet enters the first network through a first edge network device includes obtaining the source IP address from the attack information; and determining the first edge network device according to a correspondence between the source IP address and the first edge network device.

Optionally, the determining that the network attack packet enters the first network through a first edge network device includes obtaining data traffic of packets whose destination addresses are the target IP address and that are received by each edge network device in multiple edge network devices in the first network in a preset time period, where the multiple edge network devices include the first edge network device; and determining that the data traffic of the first edge network device in the preset time period satisfies a first preset condition.

Optionally, before the determining the first edge network device according to a correspondence between the source IP address and the first edge network device, the processor 81 is further configured to perform obtaining the correspondence between the source IP address and the first edge network device from an SDN controller; or obtaining the correspondence between the source IP address and the first edge network device from the first edge network device.

Optionally, the first preset condition is that the data traffic exceeds a preset value, and the defense policy is discarding a packet whose destination address is the target IP address.

Optionally, the defense policy sent to the first edge network device includes discarding a packet whose destination address is the target IP address; or discarding a packet whose destination address is the target IP address and that satisfies a second preset condition.

The steps in the embodiments shown in FIG. 3 to FIG. 5 may be performed by the defense policy sending apparatus in this embodiment. The defense policy sending apparatus in this embodiment may be the defense policy sending apparatus 21 in the system architectures shown in FIG. 1 and FIG. 2.

In this embodiment, because the network attack packet enters the first network through the first edge network device, sending the defense policy to the first edge network device to instruct the first edge network device to defend against the network attack reduces transmission of the network attack packet in the first network, saves transmission resources of the first network, and improves an effect of defending against the network attack packet.

Figure 9:
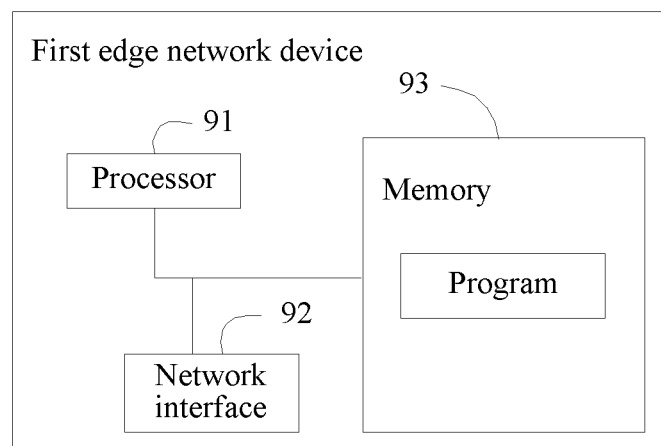
FIG. 9 is a schematic structural diagram of another first edge network device according to an embodiment of this application.

Referring to FIG. 9, FIG. 9 is a schematic structural diagram of a first edge network device according to an embodiment of this application. As shown in FIG. 9, the first edge network device includes a processor 91, a network interface 92, and a memory 93.

The processor 91 includes, but is not limited to, one or more of a CPU, a NP, an ASIC, or a PLD. The PLD may be a CPLD, a FPGA, a GAL, or any combination thereof.

The network interface 92 may be a wired interface, such as a FDDI, or an Ethernet interface. Alternatively, the network interface 92 may be a wireless interface, such as a wireless local area network interface.

The memory 93 includes, but is not limited to, a RAM, a ROM, and an EPROM.

The processor 91 is configured to read a program stored in the memory 93 to perform the following operations: receiving a defense policy using the network interface 92, where the defense policy includes a target IP address, the defense policy is used to instruct the first edge network device to process, according to the defense policy, a packet whose destination address is the target IP address, the first edge network device is an edge network device in a first network, a network attack packet whose destination address is the target IP address exists in the first network, and the network attack packet enters the first network through the first edge network device; and processing, according to the defense policy, a packet whose destination address is the target IP address.

Optionally, data traffic of packets whose destination addresses are the target IP address and that are received by the first edge network device in a preset time period exceeds a preset value, and the defense policy is discarding a packet whose destination address is the target IP address.

Optionally, the defense policy received by the apparatus includes discarding a packet whose destination address is the target IP address; or discarding a packet whose destination address is the target IP address and that satisfies a second preset condition.

The first edge network device in this embodiment may be the first edge network device in the embodiments shown in FIG. 3 to FIG. 5. The first edge network device in this embodiment may be the edge network device in the system architectures shown in FIG. 1 and FIG. 2.

In this embodiment, because the network attack packet enters the first network through the first edge network device, executing the defense policy at the first edge network device reduces transmission of the network attack packet in the first network, saves transmission resources of the first network, and improves an effect of defending against the network attack packet.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disc, an optical disc, a ROM, or a RAM.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A method implemented by a defense policy sending apparatus, the method comprising:
   receiving attack information comprising a target Internet Protocol (IP) address and a source IP address of a network attack packet whose destination address is the target IP address, wherein the attack information indicates that the network attack packet exists in a first network, and wherein the attack information and the network attack packet are different;
   obtaining the source IP address from the attack information,
   determining that the network attack packet has entered the first network through a first edge network device based on a correspondence between the source IP address and the first edge network device, wherein the first edge network device is an edge device in the first network; and
   sending, to the first edge network device, a defense policy instructing the first edge network device to process, according to the defense policy, a packet whose destination address is the target IP address.

2. The method of claim 1, wherein before determining that the network attack packet has entered the first network through the first edge network device, the method further comprises obtaining the correspondence from a software-defined networking (SDN) controller.

3. The method of claim 1, wherein before determining that the network attack packet has entered the first network through the first edge network device, the method further comprises obtaining the correspondence from the first edge network device.

4. The method of claim 1, wherein determining that the network attack packet has entered the first network through the first edge network device comprises:
   obtaining data traffic of packets whose destination addresses are the target IP address and that are received by each edge network device in edge network devices in the first network in a preset time period, wherein the edge network devices comprise the first edge network device; and
   determining that the data traffic satisfies a first preset condition.

5. The method of claim 4, wherein the first preset condition is that the data traffic exceeds a preset value, and wherein the defense policy comprises discarding a packet whose destination address is the target IP address.

6. The method of claim 1, wherein the defense policy comprises discarding a packet whose destination address is the target IP address.

7. The method of claim 1, wherein the defense policy comprises discarding a packet whose destination address is the target IP address and that satisfies a second preset condition.

8. A method comprising:
   receiving, by a defense policy sending apparatus, attack information comprising a target Internet Protocol (IP) address and a source IP address of a network attack packet whose destination address is the target IP address, wherein the attack information indicates that the network attack packet exists in a first network, and wherein the attack information and the network attack packet are different;
   obtaining, by the defense policy sending apparatus, the source IP address from the attack information;
   determining, by the defense policy sending apparatus, that the network attack packet has entered the first network through a first edge network device based on a correspondence between the source IP address and the first edge network device, wherein the first edge network device is an edge device in the first network;
   sending, to the first edge network device, the defense policy instructing the first edge network device to process, according to the defense policy, a packet whose destination address is the target IP address;
   receiving, by the first edge network device, the defense policy; and
   processing, by the first edge network device according to the defense policy, a packet whose destination address is the target IP address.

9. The method of claim 8, wherein data traffic of packets whose destination addresses are the target IP address and that are received by the first edge network device in a preset time period exceeds a preset value, and wherein the defense policy comprises discarding a packet whose destination address is the target IP address.

10. The method of claim 8, wherein the defense policy comprises discarding a packet whose destination address is the target IP address.

11. The method of claim 8, wherein the defense policy comprises discarding a packet whose destination address is the target IP address and that satisfies a second preset condition.

12. An apparatus comprising:
   a network interface;
   a memory configured to store executable instructions; and
   a processor coupled to the network interface and the memory and configured to execute the executable instructions to:
      receive, using the network interface, attack information comprising a target Internet Protocol (IP) address and a source IP address of a network attack packet whose destination address is the target IP address, wherein the attack information indicates that the network attack packet exists in a first network, and wherein the attack information and the network attack packet are different;
      obtain the source IP address from the attack information;
      determine that the network attack packet has entered the first network through a first edge network device based on a correspondence between the source IP address and the first edge network device, wherein the first edge network device is an edge device in the first network; and
      send, to the first edge network device using the network interface, a defense policy instructing the first edge network device to process, according to the defense policy, a packet whose destination address is the target IP address.

13. The apparatus of claim 12, wherein before determining that the network attack packet has entered the first network through the first edge network device, the processor is further configured to obtain the correspondence from a software-defined networking (SDN) controller.

14. The apparatus of claim 12, wherein the processor is configured to determine that the network attack packet has entered the first network through the first edge network device by:
- obtaining data traffic of packets whose destination addresses are the target IP address and that are received by each edge network device in edge network devices in the first network in a preset time period, wherein the edge network devices comprise the first edge network device; and
- determining that the data traffic satisfies a first preset condition.

15. The apparatus of claim 14, wherein the first preset condition is that the data traffic exceeds a preset value.

16. The apparatus of claim 12, wherein the defense policy comprises discarding a packet whose destination address is the target IP address.

17. A communications system comprising:
a defense policy sending apparatus configured to:
- receive attack information comprising a target Internet Protocol (IP) address and a source IP address of a network attack packet whose destination address is the target IP address, wherein the attack information indicates that the network attack packet exists in a first network, and wherein the attack information and the network attack packet are different,
- obtain the source IP address from the attack information,
- determine that the network attack packet has entered the first network through a first edge network device based on a correspondence between the source IP address and the first edge network device, wherein the first edge network device is an edge device in the first network, and
- send a defense policy instructing the first edge network device to process, according to the defense policy, a packet whose destination address is the target IP address, and the first edge network device configured to:
- receive the defense policy, and
- process, according to the defense policy, a packet whose destination address is the target IP address.

18. The communications system of claim 17, wherein data traffic of packets whose destination addresses are the target IP address and that are received by the first edge network device in a preset time period exceeds a preset value.

19. The communications system of claim 17, wherein the defense policy comprises discarding a packet whose destination address is the target IP address.

20. The communications system of claim 18, wherein the defense policy comprises discarding a packet whose destination address is the target IP address.

21. The apparatus of claim 15, wherein the defense policy comprises discarding a packet whose destination address is the target IP address.

* * * * *